(12) United States Patent
Wurzburg et al.

(10) Patent No.: US 7,478,191 B2
(45) Date of Patent: Jan. 13, 2009

(54) METHOD FOR AUTOMATICALLY SWITCHING USB PERIPHERALS BETWEEN USB HOSTS

(75) Inventors: Henry Wurzburg, Austin, TX (US); Steve Nelson, Miller Place, NY (US); Mark Y. Fu, Newark, CA (US); Hans Magnusson, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 117 days.

(21) Appl. No.: 11/457,389

(22) Filed: Jul. 13, 2006

(65) Prior Publication Data

US 2007/0245058 A1 Oct. 18, 2007

Related U.S. Application Data

(60) Provisional application No. 60/792,247, filed on Apr. 14, 2006.

(51) Int. Cl.
*G06F 13/00* (2006.01)
(52) U.S. Cl. .................. 710/316; 710/17; 710/305
(58) Field of Classification Search .......... 710/17, 710/18, 62, 63, 110, 305, 316, 317
See application file for complete search history.

(56) References Cited

U.S. PATENT DOCUMENTS

| | | | |
|---|---|---|---|
| 5,784,581 A * | 7/1998 | Hannah | 710/110 |
| 5,978,389 A | 11/1999 | Chen | |
| 6,282,601 B1 * | 8/2001 | Goodman et al. | 710/260 |
| 6,308,239 B1 | 10/2001 | Osakada et al. | |
| 6,516,205 B1 * | 2/2003 | Oguma | 455/557 |
| 6,532,512 B1 | 3/2003 | Torii et al. | |
| 6,732,218 B2 | 5/2004 | Overtoom et al. | |
| 6,750,569 B2 | 6/2004 | Liao | |

(Continued)

FOREIGN PATENT DOCUMENTS

DE 298 06 131 U 7/1998

(Continued)

OTHER PUBLICATIONS

"USB2.0 Compatible 4-Port Switching Hub with Two Upstream Host Ports"; SMSC Datasheet; Nov. 8, 2005; 26 pages; Standard Microsystems Corp., Hauppauge, NY.

(Continued)

*Primary Examiner*—Khanh Dang
(74) *Attorney, Agent, or Firm*—Meyertons Hood Kivlin Kowert & Goetzel, P.C.; Jeffrey C. Hood

(57) ABSTRACT

A system for automatically switching peripheral connectivity between two host devices based on respective connectivity of the hosts. The method may be used where peripherals are usually attached to one host and are automatically switched to a second host when the second host is attached to the system. A USB switching hub may be operable to automatically switch connectivity of the peripheral device(s) from the first host device to the second host device when the second host device is connected to the USB device. This automates the process for the end user when normally all peripherals are attached to one host, and some or all peripherals are shared with a second host when the second host is attached.

21 Claims, 12 Drawing Sheets

U.S. PATENT DOCUMENTS

| | | |
|---|---|---|
| 6,874,055 B2 | 3/2005 | Chiang et al. |
| 6,920,569 B1 * | 7/2005 | Wauters et al. ............... 713/300 |
| 7,093,057 B2 * | 8/2006 | Choi ........................... 710/313 |
| 2001/0032280 A1 | 10/2001 | Osakada et al. |
| 2003/0093599 A1 * | 5/2003 | Lou et al. ..................... 710/72 |
| 2003/0142683 A1 | 7/2003 | Lam et al. |
| 2004/0088449 A1 * | 5/2004 | Sakaki ........................ 710/15 |
| 2004/0111544 A1 | 6/2004 | Bennett et al. |
| 2006/0056401 A1 | 3/2006 | Bohm et al. |
| 2006/0059293 A1 | 3/2006 | Wurzburg et al. |
| 2006/0179144 A1 | 8/2006 | Nagase |

FOREIGN PATENT DOCUMENTS

| | | |
|---|---|---|
| EP | 0 982 663 A2 | 3/2000 |
| GB | 2 352 540 A | 1/2001 |
| JP | 2000-242377 | 9/2000 |
| JP | 2001-043178 | 2/2001 |
| JP | 2001229119 | 8/2001 |
| JP | 2003-195991 | 7/2003 |
| KR | 10-2004-000836 A | 1/2004 |
| KR | 10-0490068 B1 | 5/2005 |

OTHER PUBLICATIONS

"Programmable Multi-Host Device Sharing USB Hub"; Research Disclosure, IBM Corp.; Feb. 1, 1999; 1 page; Mason Publications; Hampshire, GB.

"On-The-Go Supplement to the USB 2.0 Specification—Revision 1.0"; Dec. 18, 2001; 74 pages.

Fred Zlotnick; "AND8158/D NLAS4717 Analog Switch Permits USB 1.1 Switching"; ON Semiconductor; 4 pages.

"FSUSB11 Low Power Full Speed USB (12Mbps) Switch"; Apr. 2004 (revised Jul. 2005); 9 pages; Fairchild Semiconductor.

"FSUSB22 Low Power 2 Port Hi-Speed USB 2.0 (480 Mbps) Switch"; 3 pages; Fairchild Semiconductor.

"USB 1.1 Switch Offers Low Power And Bandwidth"; Jul./Aug. 2004; 3 pages; Fairchild Semiconductor Corp.

International search report and written opinion for application No. PCT/US2007/066612, mailed Aug. 6, 2007.

Computer-generated translation of JP2001229119A Publication, "Device Selection Hubbox By Plural Computers", by Hitachi Ltd., published Aug. 24, 2001, 21 pages.

Human-generated translation of JP2001229119A Publication, "Device Selection Hubbox By Plural Computers", by Hitachi Ltd., published Aug. 24, 2001, 2 pages.

Korean Office Action for Application 10-2007-7005961, entitled "Universal Serial Bus Switching Hub," dated Apr. 18, 2008, 5 pages.

Human translation of previously cited reference JP 2001229119A Publication, "Device Selection Hubbox By Plural Computers" obtained on Jun. 23, 2008, (12 pages).

* cited by examiner

METHOD FOR AUTOMATICALLY SWITCHING USB PERIPHERALS BETWEEN USB HOSTS

PRIORITY CLAIM

This application claims benefit of priority of provisional application Ser. No. 60/792,247 titled "Method for Automatically Switching USB Peripherals Between USB Hosts", filed on Apr. 14, 2006, whose inventors are Henry Wurzburg, Steve Nelson, Mark Y. Fu, Hans Magnusson and Douglas L. Smith, and which is hereby incorporated by reference as though fully and completely set forth herein.

BACKGROUND OF THE INVENTION

1. Field of the Invention

The present invention relates generally to peripheral device hubs and, more specifically, to Universal Serial Bus (USB) switching hubs.

2. Description of the Related Art

The Universal Serial Bus (USB) allows coupling of peripheral devices to a computer system. USB is a serial cable bus for data exchange between a host computer and a wide range of simultaneously accessible devices. The bus allows peripherals to be attached, configured, used, and detached while the host is in operation. For example, USB printers, scanners, digital cameras, storage devices, card readers, etc. may communicate with a host computer system over USB. USB based systems may require that a USB host controller be present in the host system, and that the operating system (OS) of the host system support USB and USB Mass Storage Class Devices.

USB devices may communicate over the USB bus at low-speed (LS), full-speed (FS), or high-speed (HS). A connection between the USB device and the host may be established via digital interconnect such as Interchip USB, ULPI, UTMI, etc., or via a four wire interface that includes a power line, a ground line, and a pair of data lines D+ and D−. When a USB device connects to the host, the USB device may first pull a D+ line high (the D− line if the device is a low speed device) using a pull up resistor on the D+ line. The host may respond by resetting the USB device. If the USB device is a high-speed USB device, the USB device may "chirp" by driving the D− line high during the reset. The host may respond to the "chirp" by alternately driving the D+ and D− lines high. The USB device may then electronically remove the pull up resistor and continue communicating at high speed. When disconnecting, full-speed devices may remove the pull up resistor from the D+ line (i.e., "tri-state" the line), while high-speed USB devices may tri-state both the D+ and D− lines.

A USB hub may be coupled to a USB host controller to allow multiple USB devices to be coupled to the host system through the USB host controller. In addition, other USB hubs may be coupled to the USB hub to provide additional USB device connections to the USB host controller.

Some dual role peripheral devices may include a slave controller and be capable of communicating with other peripheral devices coupled to them. For example, a dual role USB printer may be able to communicate directly with a USB camera to print pictures from the USB camera. The dual role USB printer may also be accessible (e.g., by a computer system) as a slave peripheral device. If a computer system and dual role peripheral device need to alternately access a peripheral device, the peripheral device may need to be unplugged from one device and coupled to the other. Prior art device switches may not work for high-speed peripheral devices. For example, mechanical switches may introduce too much capacitance or inductance to work with high-speed peripheral devices. High-speed peripheral devices also typically require smooth impedance to prevent ringing (mechanical switches introduce irregularities in the impedance that may cause ringing).

U.S. Patent Application Publication No. 20060059293 (application Ser. No. 10/940,406) and U.S. Patent Application Publication No. 20060056401 (application Ser. No. 11/100, 299) describe a USB switching hub that can switch between upstream ports and downstream ports. A USB switching hub may be used in a system having a first host device (e.g., a computer system), wherein the switching hub may initially couple a plurality of peripheral devices to the first host device, and where it is desired to switch the peripheral devices to couple to a second host device when the second host device is attached to the system. In this instance, an easy, intuitive method for the end user to actuate the switching of peripherals between two hosts is desired. In other words, a method is desired that allows the switching of peripherals between two hosts, where peripherals are usually attached to one host and are switched to a second host when the second host is attached to the system.

Other corresponding issues related to the prior art will become apparent to one skilled in the art after comparing such prior art with the present invention as described herein.

SUMMARY OF THE INVENTION

One embodiment of the invention provides an easy, intuitive system and method for automatically switching peripheral connectivity between two host devices based on respective connectivity of the hosts. For example, the method may be used where peripherals are usually attached to one host and are automatically switched to a second host when the second host is attached to the system.

An exemplary system may comprise a USB device, a first host device (e.g., a computer system) coupled to the USB device, a plurality of peripheral devices coupled to the USB device, and a second host device that may be selectively coupled to the USB device. The USB device may be a display device, computer docking station, multimedia player docking station, camera docking station, or any other type of USB device. The USB device may include a USB switching hub which may operate to automatically switch connectivity of the peripheral devices between the first host device and the second host device. More specifically, the USB switching hub may operate to automatically switch connectivity of the peripheral devices from the first host device to the second host device when the second host device is connected to the USB device. This automates the process for the end user when normally all peripherals are attached to one host, and then some or all of the peripherals are shared with a second host when the second host is attached. Thus, the user is not required to manually press a switch or button or change cables or otherwise manually effect the switching.

In one embodiment, the USB switching hub has electrical inputs that select how peripherals are assigned to its upstream hosts. Automatic switching may be accomplished by using the VBUS signal from the second host connector to select between two configurations. This can be done in a level sensitive mode or by selecting one of a plurality of possible configurations. In one set of embodiments, 1 of 8 possible configurations may be selected when operating in configuration selection mode. Thus when the second host device is connected to the USB device comprising the switching hub, the VBUS signal is provided from the second host device and received at the USB switching hub. The USB switching hub senses the VBUS signal and automatically switches some or all of the attached peripherals from the first host device to the second host device.

As one example, the USB device may be display (monitor) comprising a hub and coupled to peripherals that normally operate with the computer (PC). When a user attaches a second host device, such as a PDA or media player, via cable to the display device (connecting to the switching hubs second host port), some or all of the peripherals are switched from the PC to the second host device. The peripherals are then switched back to the PC when the second host device (PDA or media player) is detached. As another example, a laptop docking station would normally couple attached peripherals to a desktop PC when the laptop PC is not docked to the docking station. The switching hub in the laptop docking station would automatically switch the peripherals from the users desktop computer to the laptop when the laptop is inserted into the docking station.

In various embodiments, the USB switching hub may control access between a plurality of upstream ports on the USB switching hub and at least a subset of a plurality of downstream ports on the USB switching hub. The USB switching hub may automatically electronically switch between different configurations (e.g., hardwired or software implemented configurations) for access between the two or more upstream ports and the downstream ports.

In a second embodiment of the invention, the secondary host may be automatically connected to the display device when attached or docked and the primary host disconnected, thereby reducing or eliminating a manual procedure. This embodiment allows, for example, a semi-permanently attached notebook PC docking station that automatically switches from the desktop PC to the docked notebook when the notebook is inserted into the dock. Alternatively, a video media player's video is automatically displayed on a monitor when the media player is attached, instead of the semi-permanently attached desktop PCs video, without detaching the PC's video cable or manually actuating a switch on the monitor.

BRIEF DESCRIPTION OF THE DRAWINGS

A better understanding of the present invention may be obtained when the following detailed description is considered in conjunction with the following drawings, in which.

Figure 1:
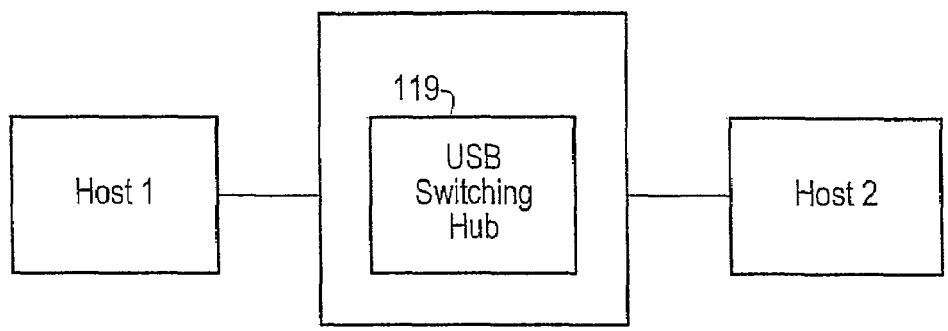
FIG. 1 is a block diagram of a system comprising a USB device that automatically selectively couples either a first host device or second host device to various peripheral devices.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (e.g., having the potential to or being able to in some embodiments), not a mandatory sense (i.e., must). The term "include", and derivations thereof, mean "including, but not limited to". The term "coupled" means "directly or indirectly connected".

DETAILED DESCRIPTION OF THE PREFERRED EMBODIMENTS

Incorporation by Reference

U.S. Patent Application Publication No. 20060059293 (application Ser. No. 10/940,406) titled "Universal Serial Bus Switching Hub" and filed on Sep. 14, 2004, whose inventors are Henry Wurzburg, James E. Bowles, Robert E. Hollingsworth, Mark R. Bohm, and Drew J. Dutton, is hereby incorporated by reference in its entirety as though fully and completely set forth herein.

U.S. Patent Application Publication No. 20060056401 (application Ser. No. 11/100,299) titled "Peripheral Sharing USB Hub" and filed on Nov. 4, 2004, whose inventors are Mark R. Bohm, Mark Y. Fu, Henry Wurzburg, James E. Bowles, Robert E. Hollingsworth and Drew J. Dutton, is hereby incorporated by reference in its entirety as though fully and completely set forth herein.

U.S. patent application Ser. No. 11/424,179 titled "Peripheral Sharing USB Hub" and filed on Jun. 14, 2006, whose inventors are Mark R. Bohm, Mark Y. Fu, Henry Wurzburg, James E. Bowles, Robert E. Hollingsworth, Drew J. Dutton, and Akhlesh Nigam, is hereby incorporated by reference in its entirety as though fully and completely set forth herein.

FIG. 1 illustrates a block diagram of an exemplary system. As shown, the system may comprise a USB hub device 106 that may include a USB switching hub 119. A first host device 102 may be coupled to USB hub device 106. A plurality of peripheral devices (not shown) may also be coupled to USB hub device 106, and USB hub device 106 may itself be a peripheral device coupling to first host device 102. A second host device 104 may also be coupled (e.g., selectively coupled) to USB hub device 106.

When second host device 104 is not connected to USB hub device 106, USB switching hub 119 may operate to provide connectivity between first host device 102 and USB hub device 106, and/or between first host device 102 and the plurality of peripheral devices coupled to USB hub device 106. When the second host device 108 is coupled to USB hub device 106, USB switching hub 119 is operable to detect this connection and automatically switch to provide connectivity between the second host device 104 and USB hub device 106, and/or between second host device 104 and the plurality of peripheral devices coupled to USB hub device 106. In so doing, USB switching hub 119 may discontinue providing connectivity between the first host device 102 and USB hub device 106, and/or between first host device 102 and the plurality of peripheral devices coupled to USB hub device 106. The "automatic" switching performed herein means that the user is not required to manually press buttons, change cables, etc. to initiate the switching, but rather merely connects second host device 104 to USB hub device 106.

Figure 2:
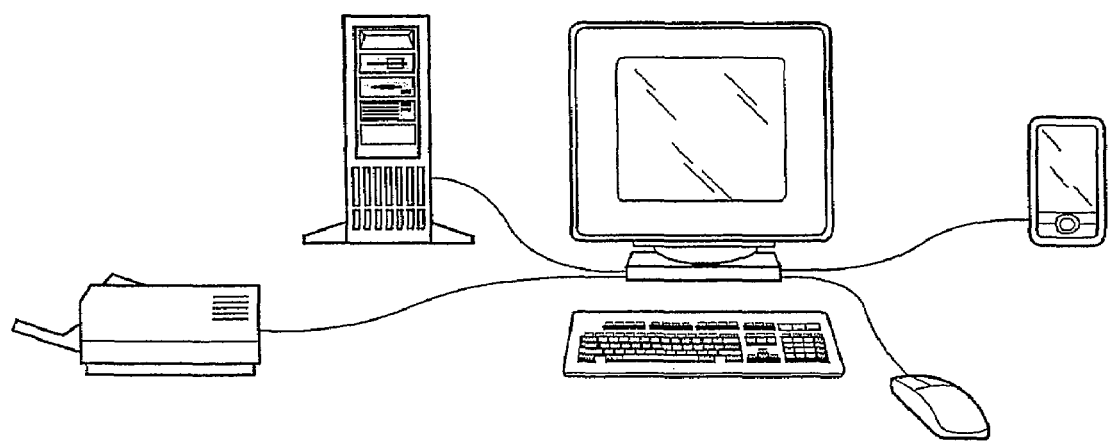
FIG. 2 illustrates a display device that implements an embodiment of the invention.

FIG. 2 illustrates an exemplary system that may include an embodiment of the invention. As shown, in this exemplary embodiment, USB hub device 106 may be a display device 151. Display device 151 may include USB switching hub 119. A first host device, such as a computer system 153, may be connected to a first host port of USB switching hub 119. A plurality of peripherals (e.g. printer 157, keyboard 159, and mouse 161) may also connect to USB switching hub 119 by coupling to display device 151. Other peripheral devices (not shown) may also be similarly coupled, and any one or more of all the peripheral devices (including those shown) may be an embodiment of USB hub device 106. A second host device, in this case a personal digital assistant (PDA) 155 may also be selectively coupled to USB switching hub 119 by coupling to display device 151.

Figure 3:
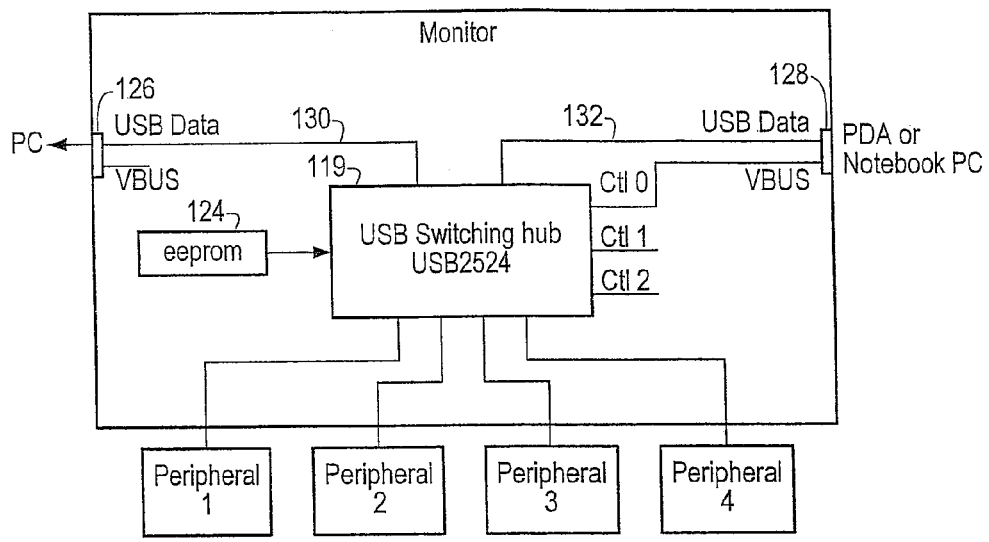
FIG. 3 is a block diagram of a display device including a USB switching hub that operates by selecting one of a number of connecting configurations, according to one embodiment of the invention.
Figure 4:
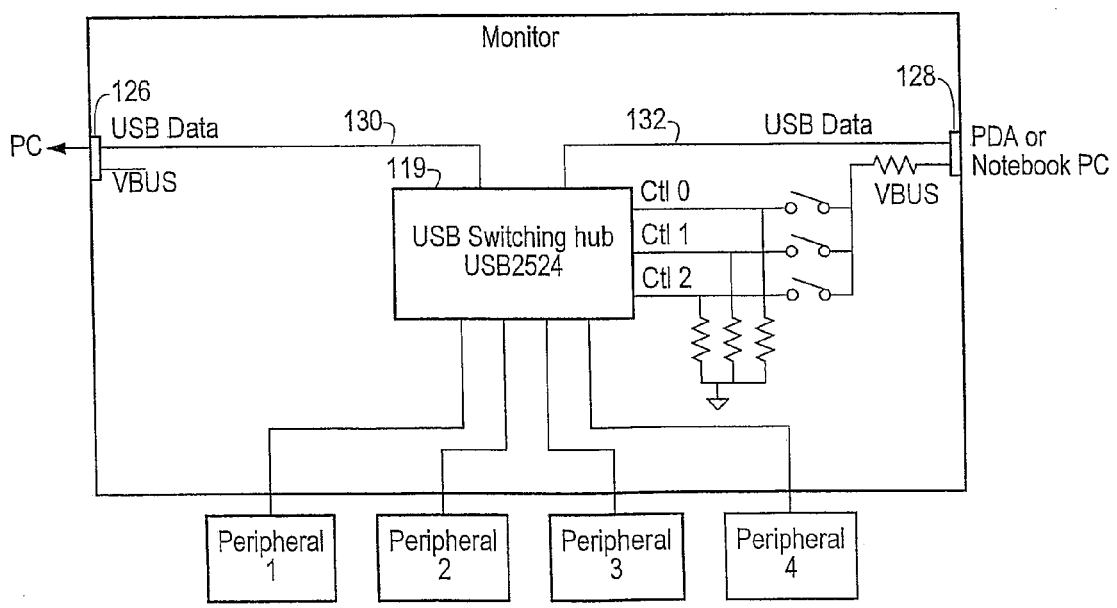
FIG. 4 is a block diagram of a display device including a USB switching hub that operates by selecting connectivity based on a level mode, according to another embodiment of the invention.

FIGS. 3 and 4 illustrate two possible embodiments of USB hub device 106. In each embodiment, USB hub device 106 is a display monitor that comprises USB switching hub 119. USB switching hub 119 may have electrical inputs that select how peripherals are assigned to its upstream hosts. Automatic switching is accomplished by using the VBUS signal from the second host connector 128 to select between two configurations. This can be done by selecting one from a number of possible connectivity configurations (e.g. selecting 1 out of 8 configurations as shown in FIG. 3) or the level sensitive mode (as shown FIG. 4).

FIG. 3 illustrates an embodiment of USB hub device 106 comprising USB switching hub 119, which selects one of multiple connectivity combinations (in this case 1 of 8) to facilitate automatic switching between first and second host devices through first host connector 126 and second host connector 128, respectively. In this embodiment, USB hub device 106 is a display device or monitor. As mentioned, USB hub device 106 may comprise USB switching hub 119. USB switching hub 119 may comprise three control input lines Ctl 0, Ctl 1, and Ctl 2. An EEPROM (Electrically Erasable Programmable Read Only Memory) 124 may be coupled to USB switching hub 119, which may be coupled to a first host device port 126 through a first USB connection 130 (which may be a USB data line). USB switching hub 119 may also be coupled to a second host device port 128 through a second USB connection 132, (which may also be a USB data line). As shown, each of the host device ports 126 and 128 may receive a VBUS signal when a host device is attached to the respective port.

In the embodiment shown in FIG. 3, EEPROM is configured to store 8 different configurations for connectivity, from which USB switching hub 119 may determine how peripherals 140-146 are to be attached to the two hosts through ports 126 and 128, respectively. In the embodiment shown in FIG. 3, one of the three control lines (in this case ctl0) may be tied to the second host device's VBUS port, which may operate to select between two connectivity configurations in EEPROM 124. Thus, when the second host device (e.g., a PDA or portable PC) is connected to second host connector 128 and drives the respective VBUS line high (e.g. to 5 volts in this embodiment), peripherals 140-146 may effectively be switched to be coupled to the second host device. The levels set on the other control lines (Ctl 1 and Ctl 2, in this case) may be used to determine and/or modify which ones of peripherals 140-146 may switch to the second host when the second host is attached to port 128 and drives VBUS to 5 v.

FIG. 4 illustrates Level Mode, which may be another method to perform switching connectivity of peripheral devices 140-146 from the first host to the second host. In this mode, the monitor/display device (i.e. an embodiment of USB hub device 106) may be configured with 4 control lines (only 3 are shown in FIG. 4 for simplicity). Each control line may be associated with a respective one of peripheral devices 140-146. The control lines may be configured such that a logic low value (0V in this embodiment) on a respective control line forces its associated peripheral device (of peripheral devices 140-146) to be attached to the first host device (e.g., the PC), and a logic high value (5V in this embodiment) on a respective control line forces its associated peripheral to be attached to the second host. Pull down resistors 171-175 may be configured to make the first host device the default or normal selection for each of peripherals 140-146. In alternate embodiments, the default selection may be host device 2. Furthermore, alternate embodiments may include additional ports for additional host devices, and other configurations with additional control lines may be possible to similarly establish default connectivity and switching connectivity between the various host devices, using USB switching hub 119. When the second host device attaches to second host connector 128 and VBUS goes high, if one or more of switches 177-181, each of which may be associated with a respective peripheral, are closed, then each peripheral corresponding to a closed switch may be electrically coupled to the second host device.

Thus the embodiments described herein provide for automatic switching of peripherals from a first host device to a second host device when the second host device is connected to the system. This provides a significant improvement over the manual selection required in the prior art. Further minimal (or no) additional components are required. In addition, the described embodiments provide an intuitive operation to the end user.

Figure 5:
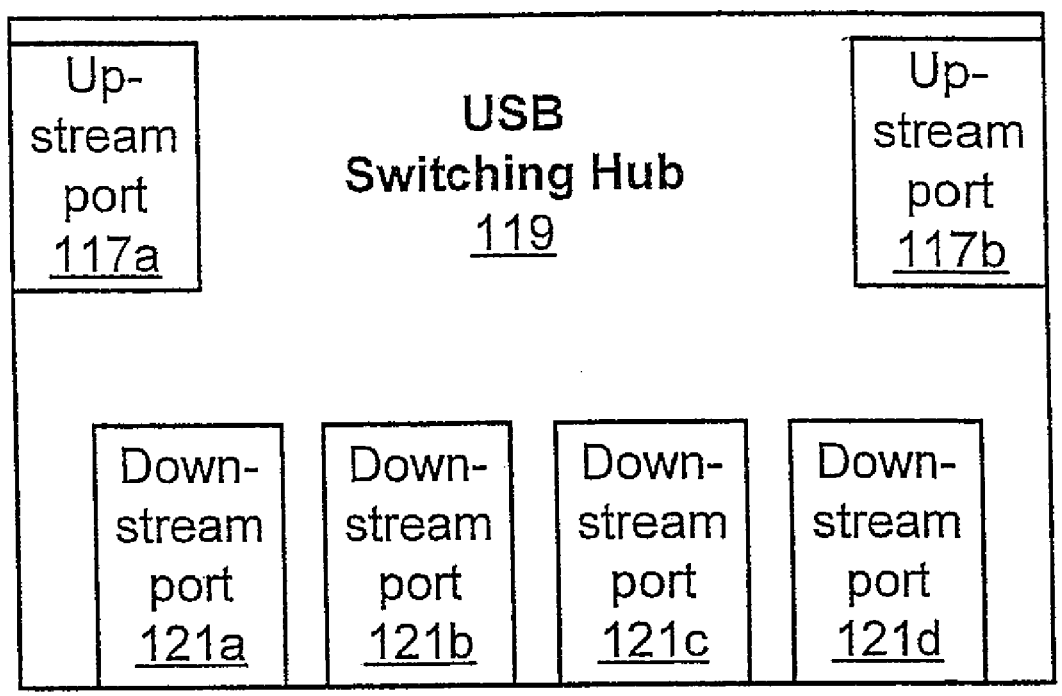
FIG. 5 illustrates a USB switching hub, according to an embodiment.

FIG. 5 illustrates an embodiment of a USB switching hub 119. In various embodiments, USB switching hub 119 may control access between a plurality of upstream ports 117 (e.g., 117*a* and 117*b*) on USB switching hub 119 and at least a subset of a plurality of downstream ports 121 (e.g., 121*a*-121*d*) on USB switching hub 119.

In some embodiments, upstream devices coupled to upstream ports 117 may enumerate USB switching hub 119 according to the total number (N) of downstream ports 121. For example, USB switching hub 119 may be enumerated as a 4-port hub (corresponding to the four downstream ports 121). In some embodiments, communications between each of downstream ports 121 and upstream ports 117 may be controlled by USB switching hub 119. In some embodiments, when first upstream port 117*a* is communicating with first downstream port 121*a*, second downstream port 121*b* may communicate with second downstream port 121*c*. Second upstream port 117*b* may register first downstream port 121*a* as disconnected. For example, status registers coupled to second upstream port 117*b* may indicate first downstream port 121*a* is disconnected (i.e., to appear that no device is electrically connected to first downstream port 121a). The disconnect status may prevent second upstream device 117b from attempting to reset and connect to first peripheral device 121a coupled to first downstream device 121a while a separate upstream device is communicating through first upstream port 117a with first downstream device 125a. By enumerating USB switching hub 119 as a 4-port hub, the upstream devices may not have to re-enumerate USB switching hub 119 (and correspondingly each downstream and/or upstream device coupled to the USB switching hub) each time a downstream device is switched.

In some embodiments, only one upstream device may access any one downstream device at a time. In some embodiments, multiple upstream devices may access separate downstream devices at the same time. In some embodiments, different communication configurations may be implemented. For example, first upstream port 117a may be allowed access to the first three downstream ports (121a, 121b, and 121c) and second upstream port 117b may be allowed access to fourth downstream port 121d. Devices coupled to first upstream port 117a and second upstream port 117b may have enumerated USB switching hub 119 as a 4-port hub, but in this example, a device coupled to first upstream port 117a may register fourth downstream port 121d as disconnected while a device coupled to second upstream port 117b may register the first three downstream ports (121a, 121b, and 121c) as disconnected.

In a second communication configuration, first upstream port 117a may be allowed to access fourth downstream port 121d while second upstream port 117b may be allowed to access the first three downstream ports (121a, 121b, and 121c). Other communication configurations are also possible (e.g., in one communication configuration neither upstream port 117 may be allowed to access any downstream port 121). In some embodiments, USB switching hub 119, after receiving a control signal (e.g., from a computer, a different attached device, a person, a sensor, a logic internal to USB switching hub 119, etc.), may switch between the first communication configuration and the second communication configuration (or another communication configuration). In some embodiments, USB switching hub 119 may not receive a control signal before switching communication configurations (e.g., switching access for first downstream device 125a from first upstream port 117a to second upstream port 117b).

Figure 6:
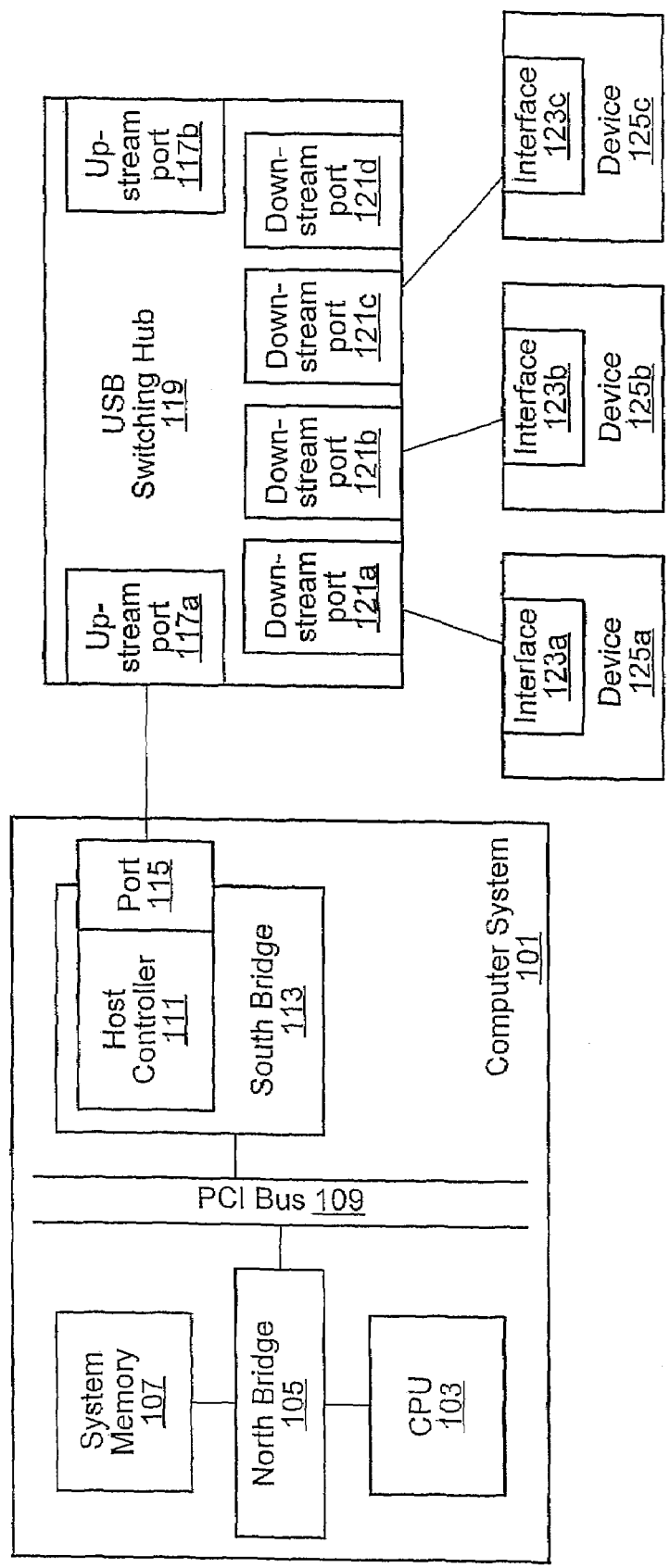
FIG. 6 illustrates a USB switching hub coupled to a computer system and to various peripheral devices according to an embodiment.

FIG. 6 illustrates an embodiment of USB switching hub 119 coupled to computer system 101. In some embodiments, computer system 101 (e.g., a personal computer (PC), laptop, server, etc.) may access multiple peripheral devices 125 coupled to USB switching hub 119. Computer system 101 may couple to USB switching hub 119 through upstream port 117. Computer system 101 may receive and transmit signals, e.g., USB signals, through host controller 111 coupled to device port 115. While various embodiments may include computer system 101, it is to be understood that other devices that have a host controller may also access USB switching hub 119. Host controller 111, coupled to south bridge 113, may be coupled to other computer components (e.g., north bridge 105, central processing unit (CPU) 103, and system memory 107) through peripheral component interconnect (PCI) bus 109.

In some embodiments, USB switching hub 119 may have multiple downstream ports 121 for coupling to multiple peripheral devices 125. Peripheral devices 125 may include USB printers, scanners, digital cameras, digital camera docks, consumer audio/video, storage devices, and card readers, among others. In some embodiments, peripheral devices 125 may couple to USB switching hub 119 through interface 123. In some embodiments, interface 123 may be a PHY interface. Other interfaces may also be used (e.g., UTMI or ULPI). Upstream ports 117 and downstream ports 121 may also have interfaces.

Figure 7:
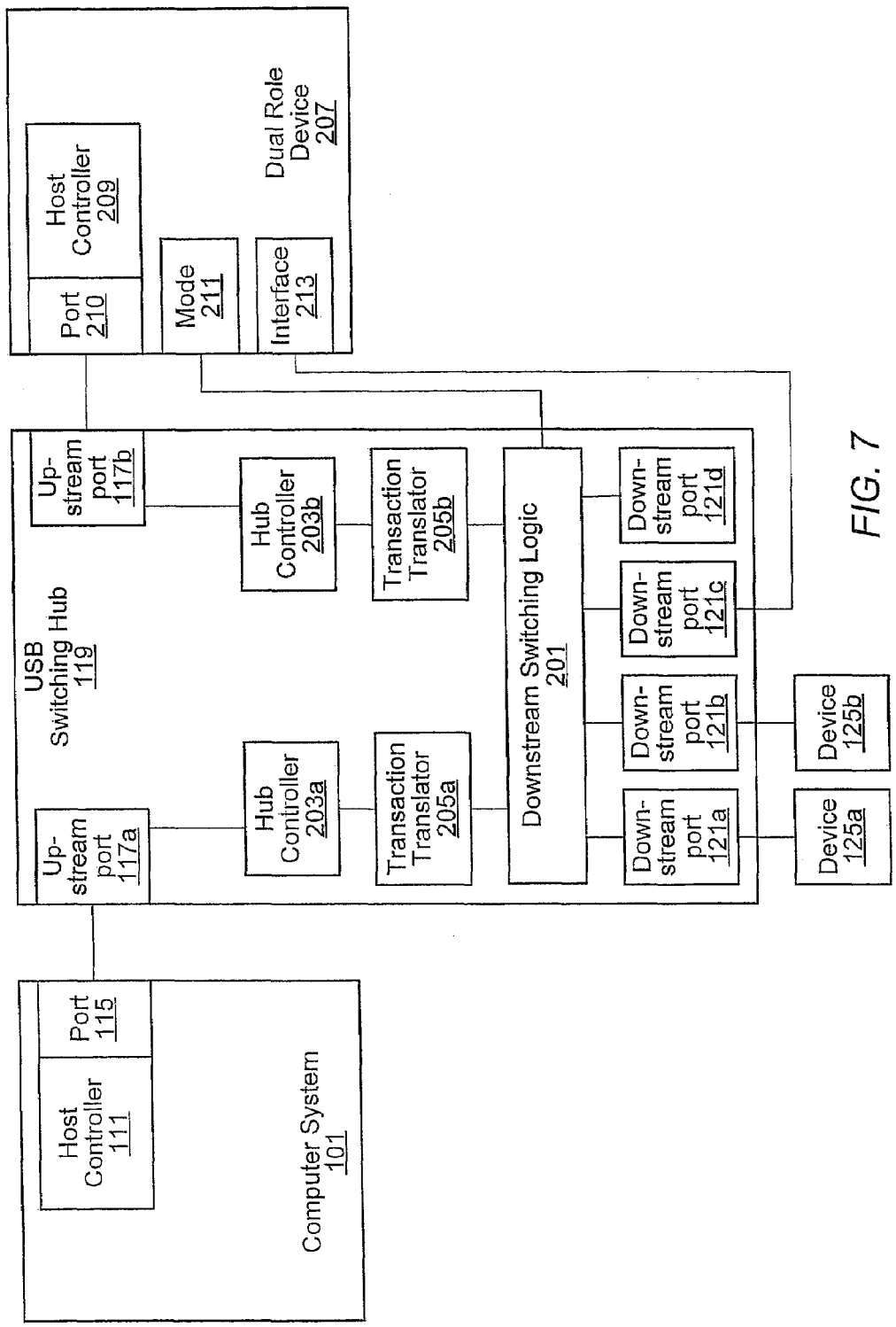
FIG. 7 illustrates a computer system and a dual role peripheral device coupled to a USB switching hub, according to one embodiment.

FIG. 7 illustrates an embodiment in which two upstream devices (e.g., computer system 101 and dual role peripheral device 207) are coupled to USB switching hub 119. In some embodiments, USB switching hub 119 may include respective transaction translator circuitry 205a and 205b for each upstream port 117a and 117b, coupled to corresponding hub controller 203a and 203b, respectively. Transaction translator circuitry 205a and 205b may also be coupled to downstream switching logic 201, which may be electronically coupled to downstream ports 121. In some embodiments, downstream switching logic 201 may switch between two or more communication configurations. Communication configurations may be implemented by downstream switching logic 201 routing communications between upstream ports 117 and downstream ports 121 while the communications are in the digital domain (as a result of the interfaces to/from USB switching hub 119). In some embodiments, communication configurations (e.g., hardwired in the USB switching hub) may be switched as determined by logic on the USB switching hub. Other communication configuration implementations are also contemplated.

In some embodiments, dual role peripheral device 207 may include a dual role USB printer or dual role USB Digital Versatile Disc (DVD) read/write drive, among others. In some embodiments, dual role peripheral device 207 may be coupled to an upstream port (e.g., upstream port 117b) of USB switching hub 119 through device port 210. Dual role peripheral device 207 may interface through upstream port 117b with other peripheral devices (downstream peripheral devices) coupled to USB switching hub 119 (e.g., using host controller 209 on dual role peripheral device 207). Dual role peripheral device 207 may also interface with other upstream devices (such as computer system 101) through a slave controller. For example, dual role peripheral device 207 may be coupled to USB switching hub 119 as a slave peripheral device (e.g., through downstream port 121c). In some embodiments, dual role peripheral device 207, coupled to the USB switching hub, may simultaneously act as a host to one or more peripheral devices and/or as slave peripheral device to a separate host.

In some embodiments, dual role peripheral device 207 may have an embedded host controller application to operate as a standalone system (e.g., to communicate with another peripheral device, such as a digital camera, without PC intervention). For example, a dual role USB printer may print pictures directly from a digital camera, coupled to a downstream port 121 on USB switching hub 119, without PC intervention. In some embodiments, USB switching hub 119 may alternately allow the computer system 101 or dual role peripheral device 207 to access one or more downstream devices (e.g., by switching between one or more communication configurations).

Figure 8A:
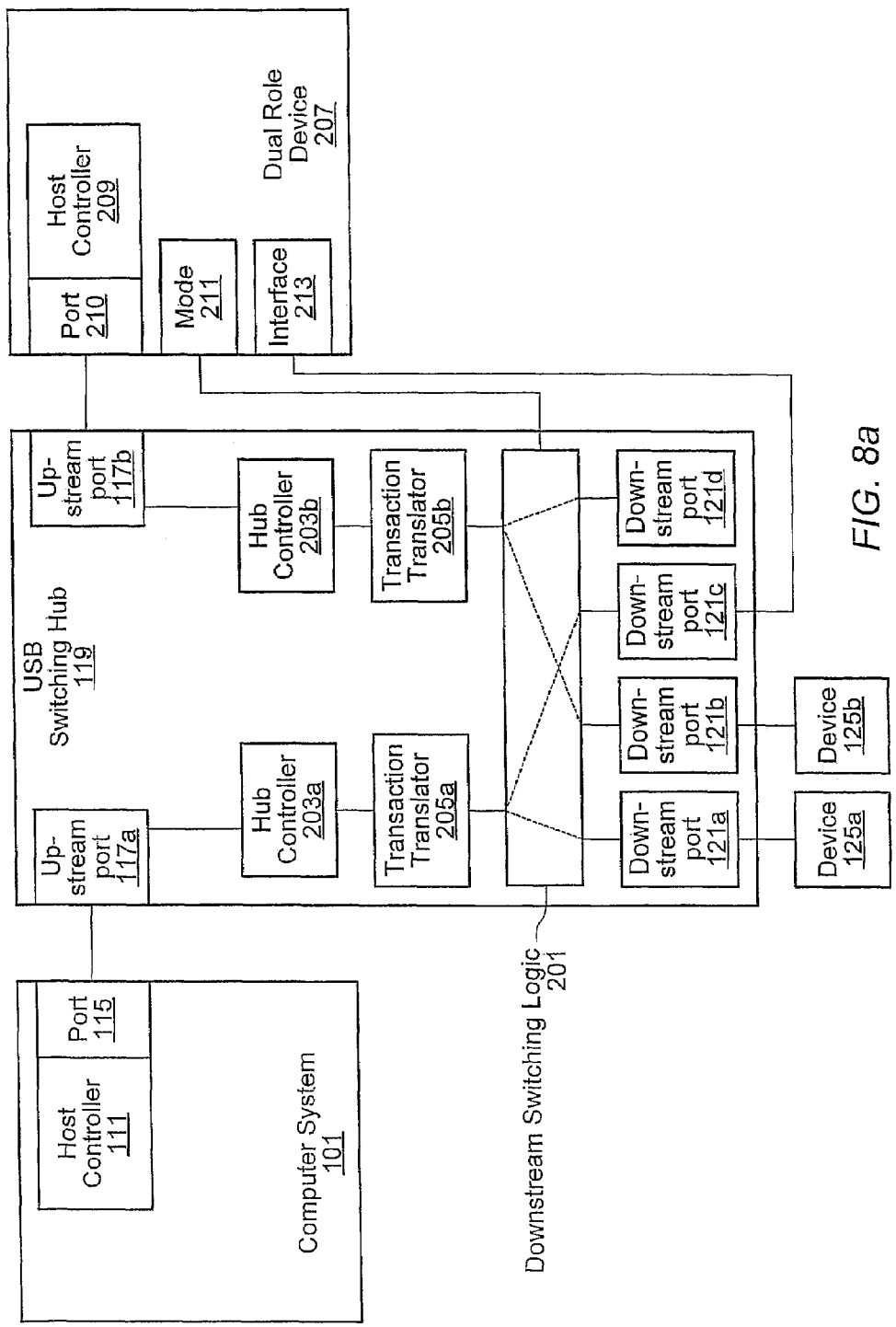
FIGS. 8a and 8b illustrate two communication configurations of the USB switching hub, according to one embodiment.
Figure 8B:
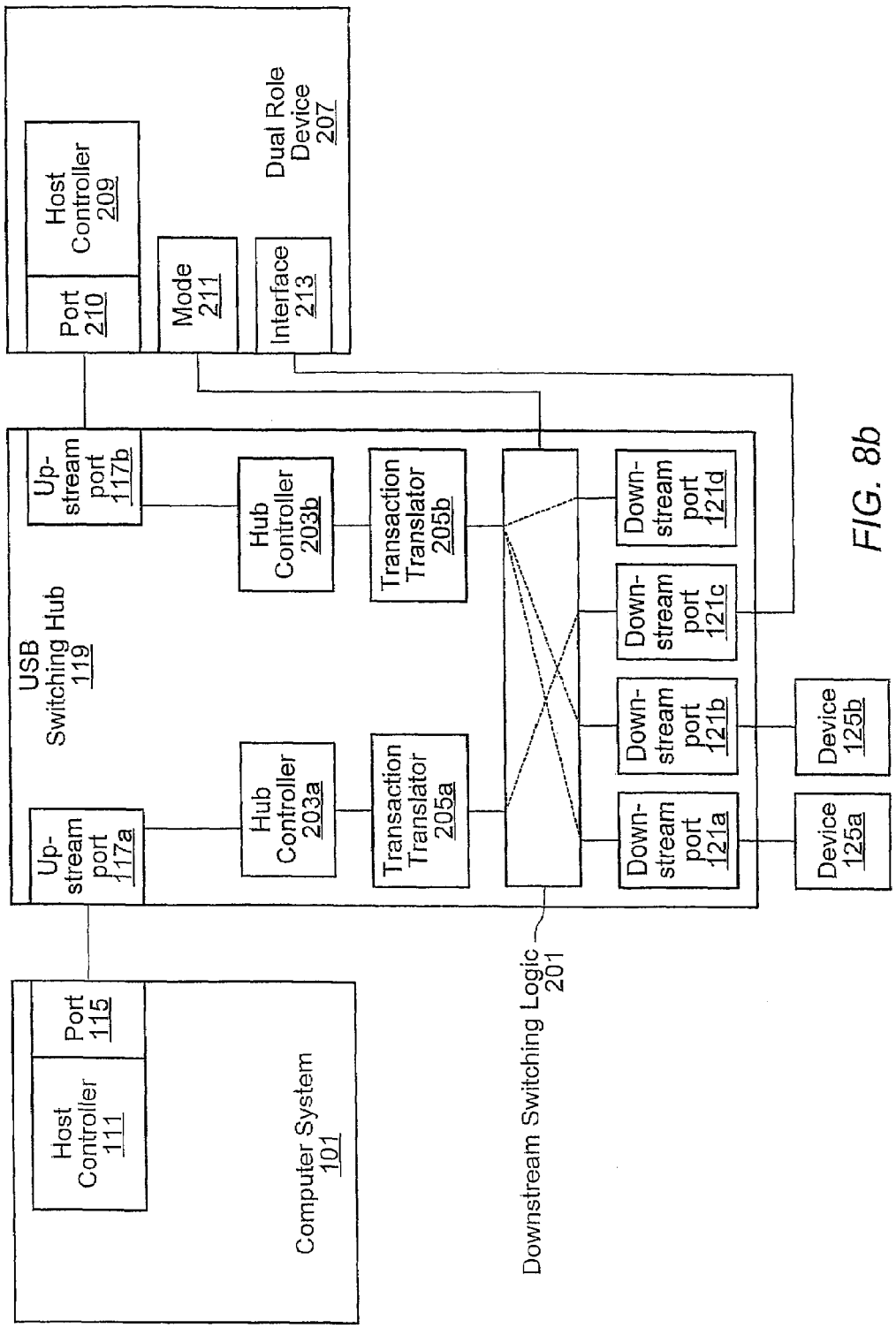

FIGS. 8a and 8b illustrate a computer system electronically coupled to multiple peripheral devices. In some embodiments, USB switching hub 119 may act like a switch coupling multiple internal "hubs" that may share one or more downstream ports. For example, each potential communication configuration of the USB switching hub may represent an internal "hub". In some embodiments, when computer system 101 is accessing peripheral device 125 (e.g., peripheral device 125a) coupled to USB switching hub 119, communications to/from the peripheral device may be processed through a first "hub" comprised of first upstream port 117a, hub controller 203a, transaction translator 205a, and at least a subset of the downstream ports 121. A second "hub" may be comprised of second upstream port 117b, hub controller 203b, transaction translator 205b, and at least a subset of the downstream ports 121. In one communication configuration, computer system 101 may connect to downstream ports 121a and 121c (through the first "hub"), and dual role peripheral device 207 may connect to downstream ports 121b and 121d (through the second "hub") (as seen in FIG. 14b). Other communication configurations are also contemplated. In some embodiments, communication configuration profiles designating which downstream devices to couple to each upstream port may be hardwired or implemented by software. For example, if implemented by software, communication configuration profiles for each upstream port (and/or upstream device) may be stored on a memory accessible to USB switching hub 119.

In some embodiments, computer system 101 and dual role peripheral device 125 may communicate through USB switching hub 119 simultaneously with separate downstream devices. For example, while computer system 101 communicates with device 125a (e.g., through the first "hub"), dual role peripheral device 207 may communicate with device 125b (e.g., through the second "hub"). In some embodiments, while peripheral device 125a is being accessed through the first "hub", a different upstream device may not be able to access peripheral device 125a (e.g., dual role peripheral device 207 may not be able to access peripheral device 125a while peripheral device 125a is being used by computer system 101). In some embodiments, a signal (e.g., from an external control block) may trigger downstream switching logic 201 to switch access for a subset of downstream ports 121 (e.g., downstream port 121a and/or 121c) on the first "hub" to the second "hub" (i.e., switch communication configurations). In some embodiments, dual role peripheral device 207 may send a control signal to USB switching hub 119. USB switching hub 119 may then switch communication configurations to connect one or more downstream ports to the dual role peripheral device. For example, when a user presses a button on dual role peripheral device 207 (e.g., a dual role printer), a signal may be sent through mode 211 to downstream switching logic 201 to switch access of device 125a from computer system 101 to dual role peripheral device 207 (i.e., to switch to a second communication configuration as seen in FIG. 8b). Computer system 101 may continue to communicate with downstream port 121c (and/or other downstream ports as determined by the second communication configuration).

In some embodiments, when activity is no longer detected between dual role peripheral device 207 and a downstream port (e.g., if dual role peripheral device 207 is turned off), downstream switching logic 201 may switch access of the downstream port to computer system 101 (i.e., switch to a different communication configuration). In some embodiments, downstream switching logic 201 may switch access of the downstream port to a different upstream device. In some embodiments, instead of detecting inactivity, a signal from dual role peripheral device 207 may signal USB switching hub 119 to switch. Other signals and/or logic may also be used in determining when to switch communication configurations.

In some embodiments, communication configurations may be software implemented. In some embodiments, a microprocessor coupled to or comprised in downstream switching logic 201 may dynamically determine, e.g., using a dynamic communication configuration profile, which downstream ports to electrically couple to each upstream port. For example, the microprocessor may read a stored communication configuration profile and attempt to connect upstream ports to downstream ports according to the communication configuration profile. The communication configuration profiles may be stored on a memory (e.g., an Electronically Erasable Programmable Read-Only Memory (EEPROM)) coupled to USB switching hub 119. In some embodiments, hub controllers 203 on USB switching hub 119 may have access to the communication configuration profiles.

In some embodiments, a priority logic may be used to switch communication configurations. Priority logic, or other logic used to grant access, may be internal or external to USB switching hub 119. In some embodiments, computer system 101 may be given priority over all of downstream ports 121 until an external control signal is sent from dual role peripheral device 207 to switch access of one or more downstream ports 121 to dual role peripheral device 207. In some embodiments, different control signals may be sent to trigger different communication configurations (i.e., to switch access of different downstream ports to dual role peripheral device 207).

In some embodiments, host negotiation logic may be used to determine which communication configuration to use. In some embodiments, a default communication configuration may be used until multiple upstream devices "request" access to the same downstream port. Host negotiation logic may be used to determine which communication configuration to use (i.e., which communication configuration gives a particular upstream port access to the "requested" downstream port).

In some embodiments, a microprocessor in USB switching hub 119 may include a built in algorithm that auto detects downstream peripheral devices and determines how to connect the downstream peripheral devices. For example, instead of assigning a specific downstream port to an upstream port, a communication configuration profile may specify that the upstream port should have access to a digital camera if one is attached. The built in algorithm may auto-detect the digital camera when it is attached to one of the downstream ports and attach it to the appropriate upstream port (i.e., by switching to an appropriate communication configuration).

In some embodiments, when downstream switching logic 201 switches communication configurations, and control of a downstream port is switched from computer system 101 to dual role peripheral device 207, a connection between computer system 101 and respective peripheral device 125 (coupled to the downstream port to be switched) may be terminated by computer system 101. In some embodiments, communications between the downstream port to be switched and computer system 101 may be terminated by USB switching hub 119. Dual role peripheral device 207 may then connect to, enumerate, and communicate with the respective peripheral device 125 coupled to the switched downstream port.

Upstream devices may see downstream ports that they are not configured to attach to as unattached ports (i.e., active, but with no device connected). In some embodiments, if only a predetermined number of downstream ports is ever going to be attached to a particular upstream port (e.g., a number "x" ports), the upstream device may be signaled that the hub only has x ports. For example, if upstream port 117b is only going to be configured to attach to downstream ports 121c and 121d, a device attached to upstream port 117b may be signaled that USB switching hub 119 is only a two port hub.

Figure 9A:
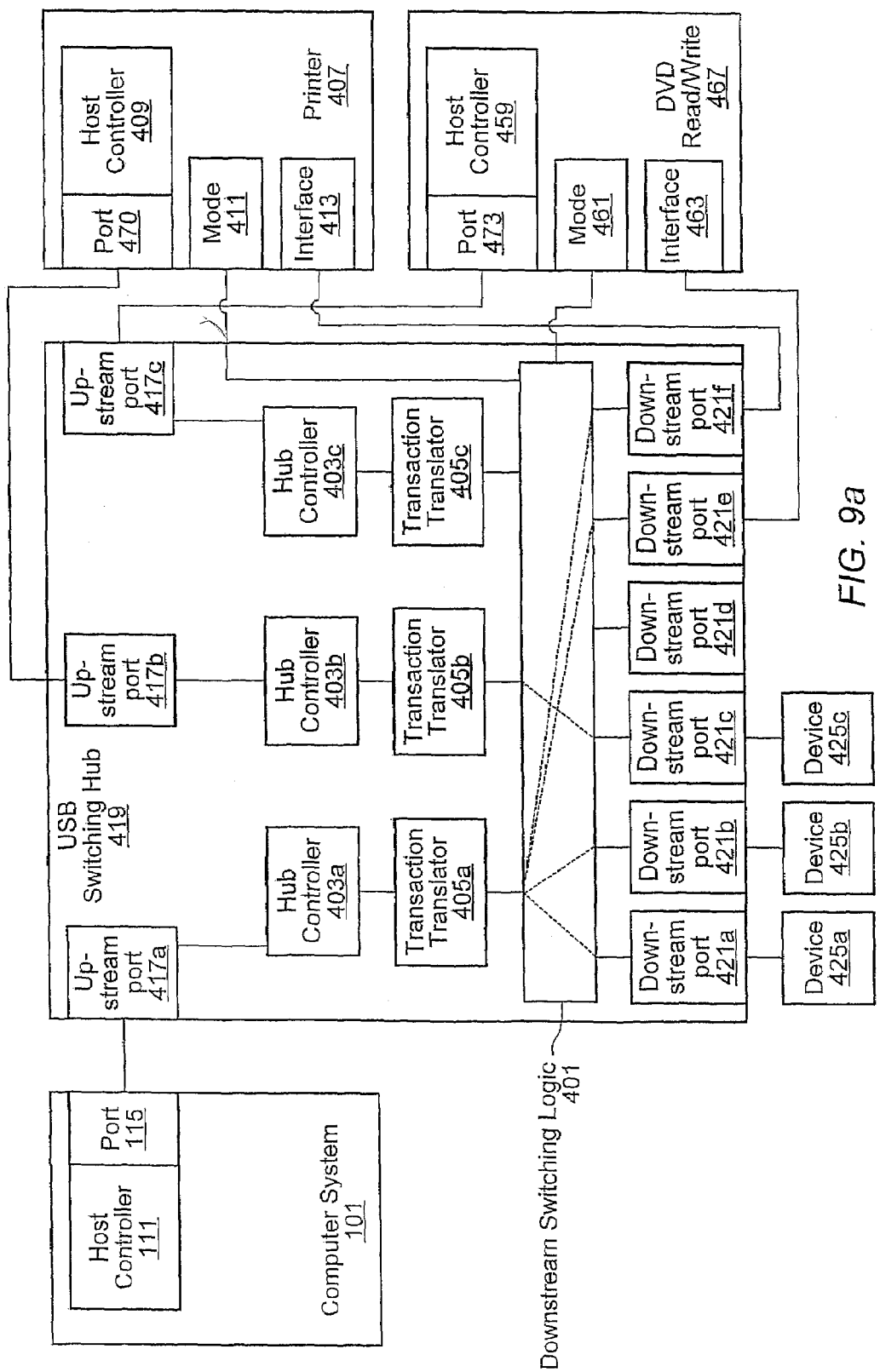
FIGS. 9a, 9b, and 9c illustrate additional communication configurations of the USB switching hub, according to one embodiment.
Figure 9B:
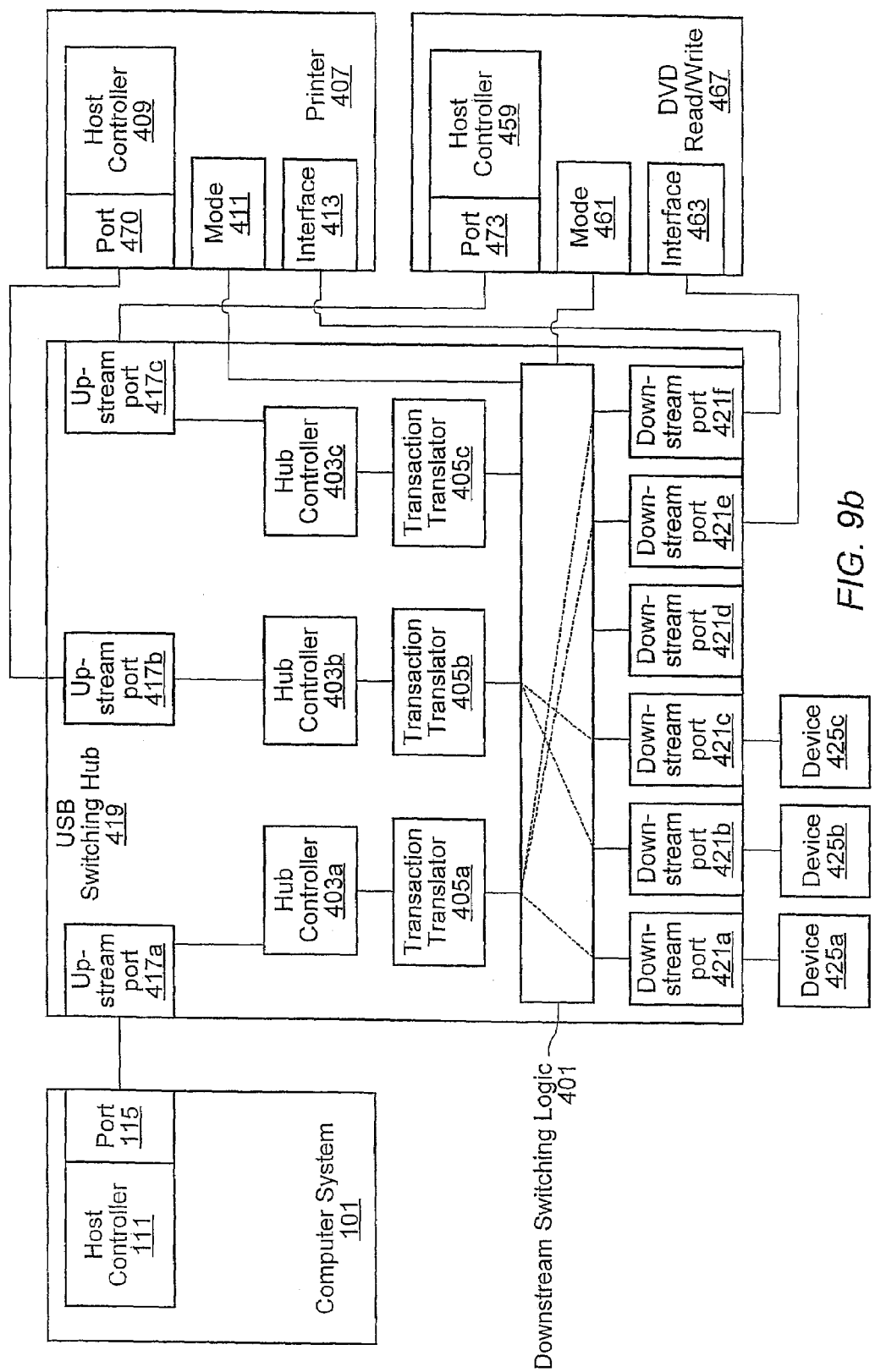
Figure 9C:
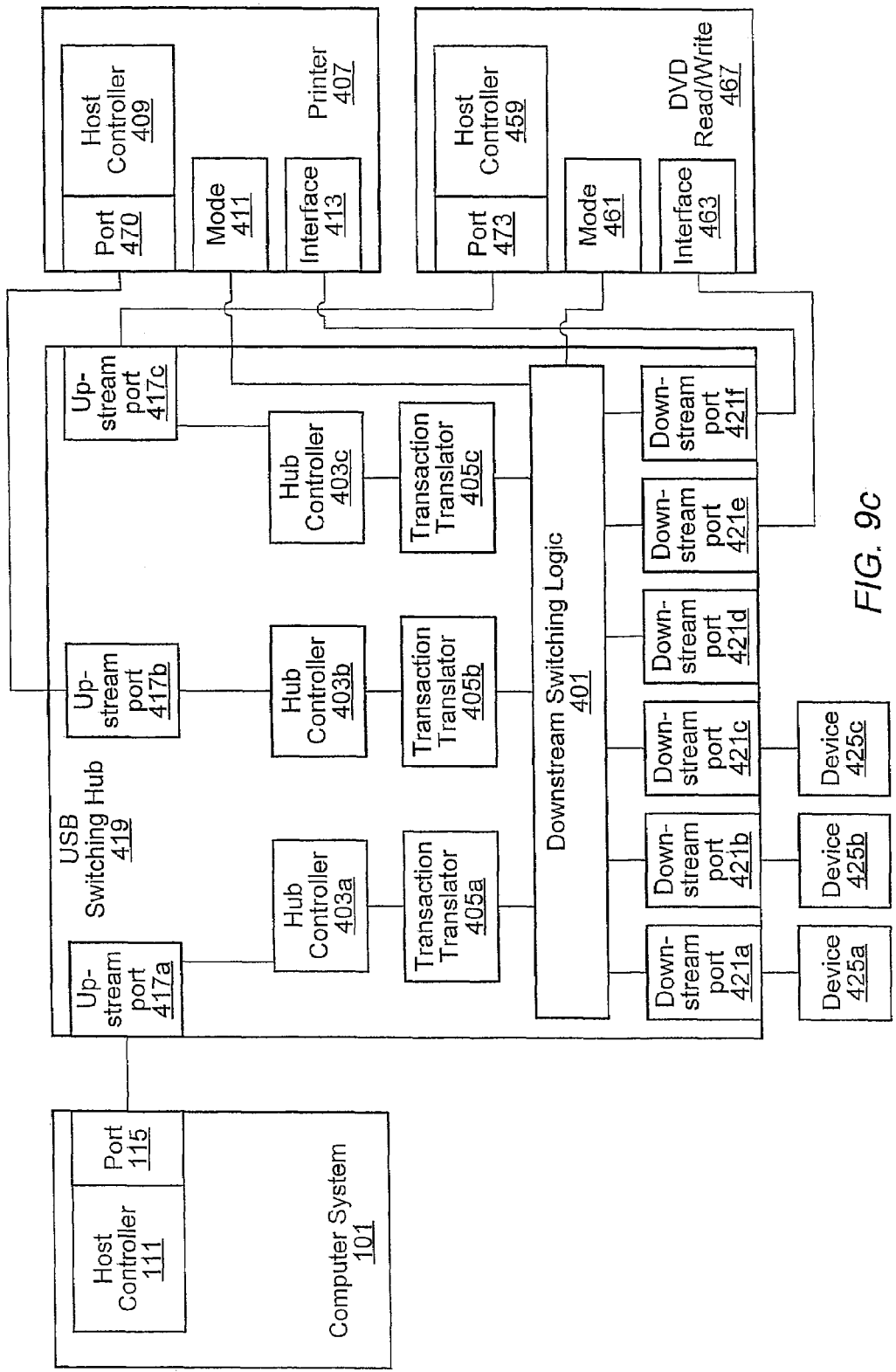

FIGS. 9a, 9b, and 9c illustrate various alternate embodiments of a computer system 101 and two dual role peripheral devices coupled to USB switching hub 419. In some embodiments, multiple dual role peripheral devices may be coupled to USB switching hub 419. For example, dual role printer 407 may be coupled to USB switching hub 419 through upstream port 417b and dual role DVD read/write drive 467 may be coupled to USB switching hub 419 through upstream port 417c. Computer system 101 may be coupled to USB switching hub 419 through upstream port 417a. Each of the upstream devices may be coupled to a respective hub controller 403 (403a, 403b and 403c, as shown), a respective transaction translator 405 (405a, 405b, and 405c, as shown), and downstream switching logic 401. Downstream switching logic 401 may configure communications between each of the upstream devices (i.e., computer system 101, dual role printer 407, or dual role DVD read/write drive 467) and at least a subset of the peripheral devices 425.

As seen in FIG. 9a, in one communication configuration profile, the computer system 101 may be connected to downstream ports 421a, 421b, 421e, and 421f. In an embodiment, dual role printer 407 may be configured to access downstream port 421c, and DVD read/write drive 467 may be configured not to access any downstream port 421. Dual role printer 407 may gain access (i.e., have the communication configuration switched to give it access) to downstream port 421b through several different methods. For example, a user may press a button on dual role printer 407. A signal may then be sent through mode 411 to downstream switching logic 401 in USB switching hub 419. Downstream switching logic 401 may switch to the communication configuration seen in FIG. 15b (which allows dual role printer 407 to access downstream port 421b). In some embodiments, if dual role printer 407 is turned off or becomes inactive, downstream switching logic 401 may switch access of downstream port 421b back to computer system 101 (i.e., switch back to the previous communication configuration). As seen in FIG. 9c, in one communication configuration, none of the upstream ports may be allowed to access any of the downstream ports.

Figure 10:
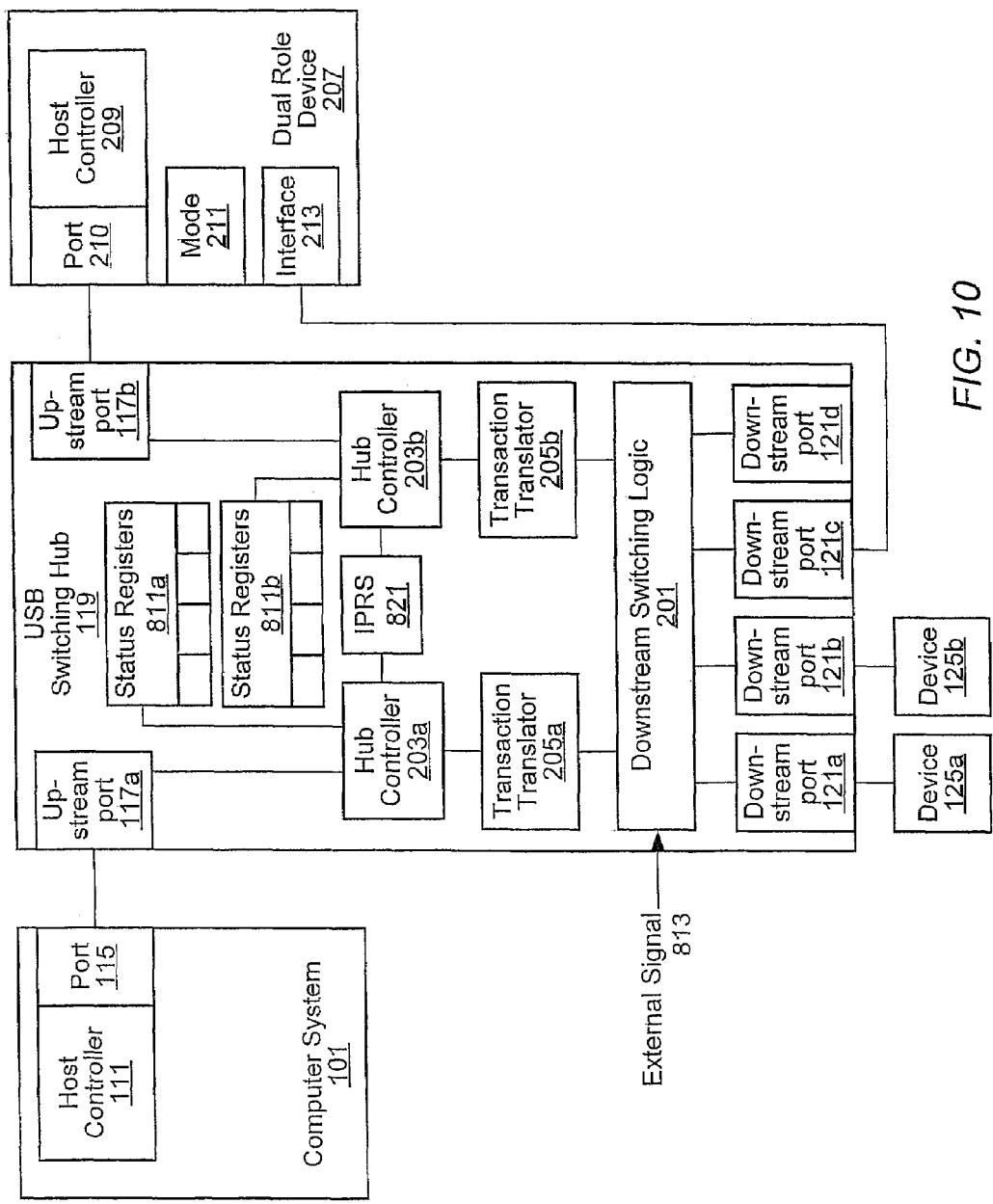
FIG. 10 illustrates a USB switching hub with multiple status registers, according to one embodiment.

FIG. 10 illustrates an embodiment of the USB switching hub with multiple status registers. In this embodiment, each hub controller (203a and 203b) is coupled to corresponding transaction translator circuitry (205a and 205b, respectively). Translator circuitry 205a and 205b may be coupled to downstream switching logic 201, which may be electrically coupled to downstream ports 121a, 121b, 121c, and 121d.

Figure 11:
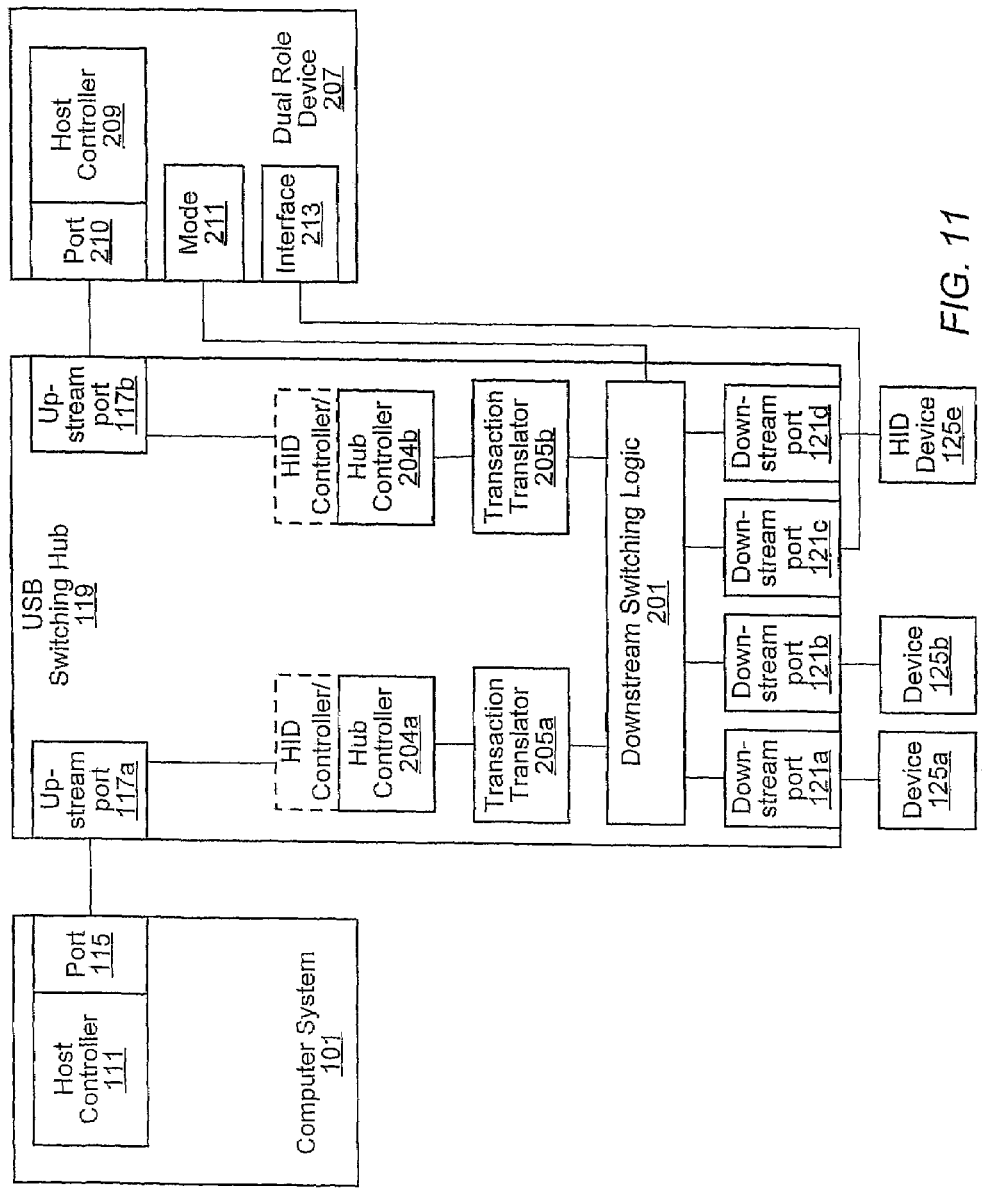
FIG. 11 illustrates an alternate embodiment of a system comprising a USB switching hub coupled to a computer system, a peripheral device, and a dual role device.

FIG. 11 illustrates another embodiment of the configuration shown in FIG. 7, in which two upstream devices (e.g., computer system 101 and dual role peripheral device 207) are coupled to USB switching hub 119. While in the embodiment of FIG. 7 the downstream control of USB switching hub 119 is linked with dual role device 207, alternate embodiments may be configured with other switching control means. For example, as illustrated in FIG. 11, switching control of USB switching hub 119 may be performed using a dedicated downstream device, for example HID class device 125e, coupled to a dedicated downstream port, for example dedicated downstream port 121e. Another control mechanism may comprise an additional HID device (not shown) configured at the hub controller level within the hierarchy of the configuration shown in FIG. 11. (for example at hub controller 203a or 203b). However, operating the additional HID device for controlling the switching of USB switching hub 119 may require custom drivers and a USB-IF class extension to the hub class, which may be covered under a vendor-specific implementation. Mechanisms other than an HID may also be possible with a semi-custom hub driver. Alternatively, a composite device comprising a hub controller and HID controller may be configured to control switching of USB switching hub 119, shown in FIG. 11 as HID controller/HUB controller composite devices 204a and 204b. While FIG. 11 illustrates a variety of configurations associated with possible control mechanisms for controlling switching of USB switching hub 119, various embodiments may include only one of, or any combination of these configurations and/or mechanisms.

In a second embodiment of the invention, the secondary host may be automatically connected to the display device when attached or docked, and the primary host is disconnected from the display device, thereby reducing or eliminating a manual procedure. This embodiment allows, for example, a semi-permanently attached notebook PC docking station that automatically switches from the desktop PC to the docked notebook when the notebook is inserted into the dock. Alternatively, a video media player's video is automatically displayed on a monitor when the media player is attached, instead of the semi-permanently attached desktop PCs video, without detaching the PC's video cable or manually actuating a switch on the monitor.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A system, comprising:
    a USB hub;
    a first host device coupled to the USB hub;
    a plurality of peripheral devices coupled to the USB hub;
    a second host device operable to be coupled to the USB hub;
    wherein the USB hub is operable to provide connectivity between the first host device and the plurality of peripheral devices when the first host device is connected to the USB hub and the second host device is not connected to the USB device;
    wherein the USB hub is operable to automatically provide connectivity between the second host device and one or more of the plurality of peripheral devices when the second host device is connected to the USB hub, wherein the USB hub is configured to maintain connectivity between the first host device and remaining ones of the plurality of peripheral devices that were not provided connectivity to the second host device.

2. The system of claim 1,
    wherein the USB hub is operable to automatically remove connectivity between the first host device and the one or more of the plurality of peripheral devices when the second host device is connected to the USB hub.

3. The system of claim 1,
    wherein the USB hub is included in a display device.

4. The system of claim 1,
    wherein the first host device is a computer system.

5. The system of claim 1, wherein the USB hub comprises:
    a plurality of upstream ports;
    a plurality N of downstream ports; and
    downstream switching logic coupled between the plurality of upstream ports and the plurality of downstream ports;

wherein the downstream switching logic is configured to electronically switch communications between:
  a) a downstream port of the plurality of downstream ports and a first upstream port of the plurality of upstream ports to
  b) the downstream port of the plurality of downstream ports and a second upstream port of the plurality of upstream ports.

6. The system of claim 5,
wherein the USB hub is configured to be enumerated with a substantially similar hub configuration through each of the plurality of upstream ports;
wherein the hub configuration includes N downstream ports.

7. A USB hub comprising:
a first input for coupling to a first USB host device;
a second input for coupling to a second USB host device;
a plurality of peripheral device inputs for coupling to respective ones of a plurality of peripheral USB devices;
switching logic that is operable to provide connectivity between the first input and the plurality of peripheral device inputs when the first USB host device is connected to the first input and the second USB host device is not connected to the second input;
wherein the switching logic is operable to automatically provide connectivity between the second input and one or more of the plurality of peripheral device inputs when the second USB host device is connected to the second input, wherein the switching logic is configured to maintain connectivity between the first input and remaining ones of the plurality of peripheral device inputs that were not provided connectivity to the second input.

8. The USB hub of claim 7,
wherein the USB hub is operable to select from a plurality of connectivity configurations to determine how each of the plurality of peripheral USB devices is coupled to the first input and/or the second input.

9. The USB hub of claim 8, further comprising a memory element coupled to the USB hub, wherein the memory element is configured to store the plurality of connectivity configurations.

10. The USB hub of claim 8, wherein the USB hub comprises a plurality of control input signals, wherein a combination of a state of each of the plurality of control input signals determines which of the plurality of connectivity configurations is selected.

11. The USB hub of claim 10, wherein the second input comprises a power connection coupled to one of the plurality of control input signals, wherein the power connection changes states when the second USB host device is coupled to the second input;
wherein one or more of the plurality of peripheral devices are coupled to the second input in response to the power connection changing states, according to a selected one of the plurality of connectivity configurations.

12. The USB hub of claim 11, wherein a combination of a state of each of remaining ones of the plurality of control input signals determines the selected one of the plurality of connectivity configurations.

13. The USB hub of claim 8, wherein the USB hub comprises a plurality of control lines, each one of the plurality of control lines corresponding to a respective one of the plurality of peripheral USB devices,
wherein a respective state of each of the plurality of control lines determines whether its corresponding respective one of the plurality of peripheral USB devices couples to the first input and/or the second input.

14. The USB hub of claim 13, wherein a default state of each of the plurality of control lines is configured to couple its corresponding respective one of the plurality of peripheral USB devices to the first input.

15. The USB hub of claim 14, wherein the second input comprises a power connection, wherein each of the plurality of control lines is coupled to the power connection through a respective switch;
wherein the power connection changes states when the second USB host device is coupled to the second input; and
wherein a position of each switch determines whether its corresponding respective one of the plurality of control lines changes states, in response to the power connection changing states.

16. The USB hub of claim 15, wherein the default state is a low state, and wherein a high state of each of the plurality of control lines is configured to couple its corresponding respective one of the plurality of peripheral USB devices to the second input;
wherein in changing states the power connection is driven to a high state from a low state.

17. A method for operating a USB device, the method comprising:
coupling a plurality of peripheral device inputs of the USB device to respective ones of a plurality of peripheral USB devices;
coupling a first input of the USB device to a first USB host device;
providing connectivity between the first input and the plurality of peripheral device inputs when the first USB host device is connected to the first input and a second USB host device is not connected to a second input of the USB device;
coupling the second input of the USB device to a second USB host device;
automatically providing connectivity between the second input and one or more of the plurality of peripheral device inputs when the second USB host device is connected to the second input; and
maintaining connectivity between the first input and remaining ones of the plurality of peripheral device inputs that were not provided connectivity to the second input.

18. The method of claim 17, further comprising automatically removing connectivity between the first input and the one or more of the plurality of peripheral device inputs when the second USB host device is connected to the second input.

19. The method of claim 17, further comprising selecting from a plurality of connectivity configurations to determine how each of the plurality of peripheral USB devices is coupled to the first input and/or the second input.

20. The method of claim 19, further comprising storing the connectivity configurations, wherein said selecting from a plurality of connectivity configurations comprises selecting from the stored connectivity configurations.

21. The method of claim 19, further comprising performing said selecting from a plurality of connectivity configurations according to a combination of a state of each of a plurality of control input signals.

* * * * *